United States Patent Office 2,955,802
Patented Oct. 11, 1960

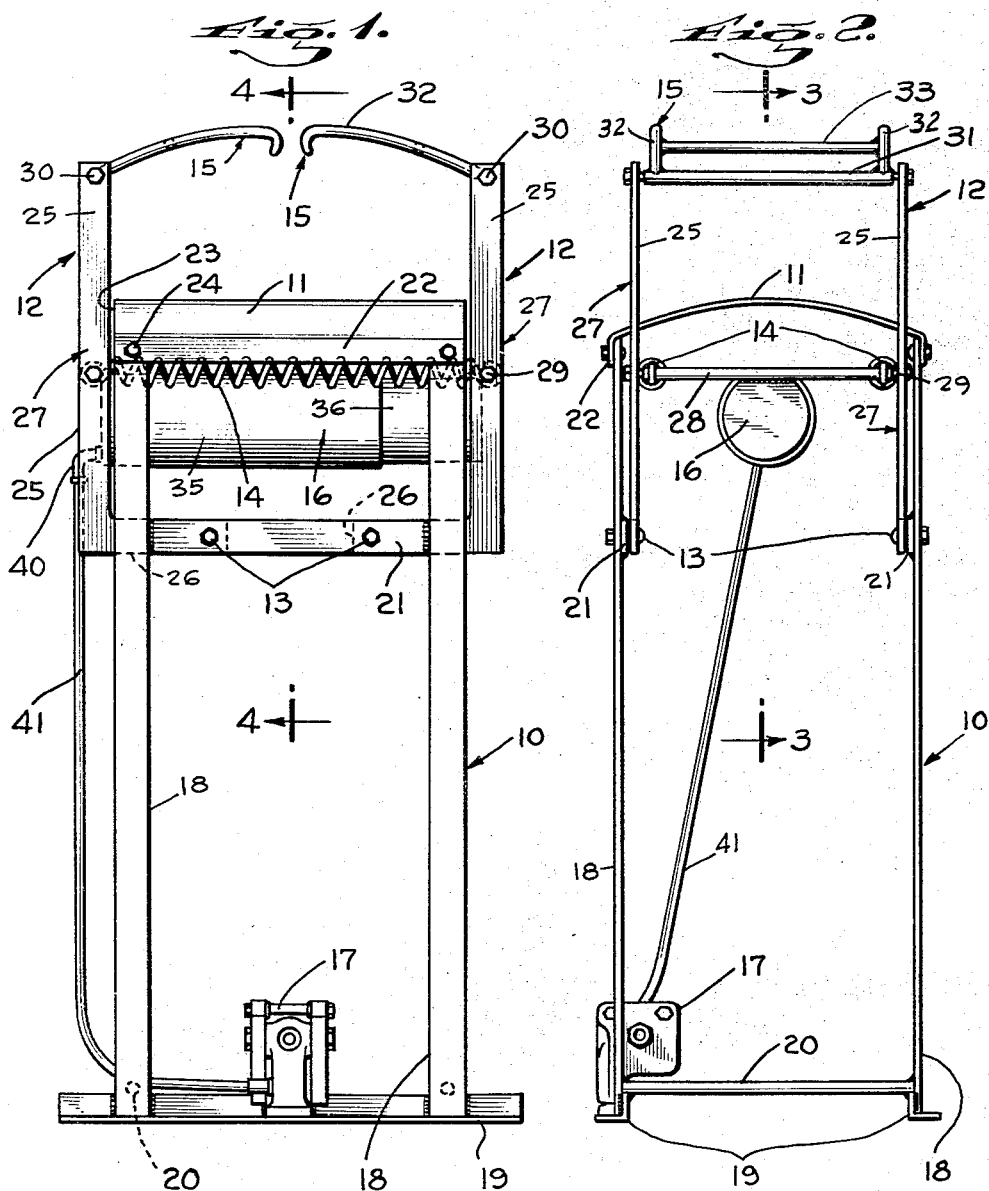

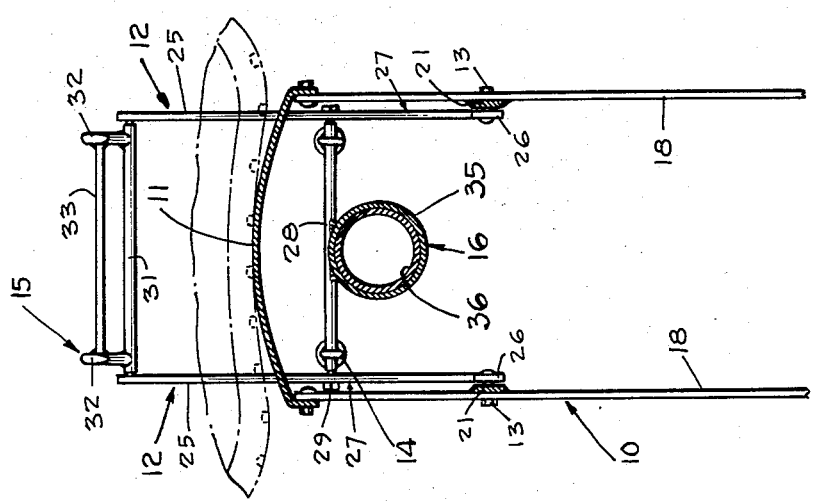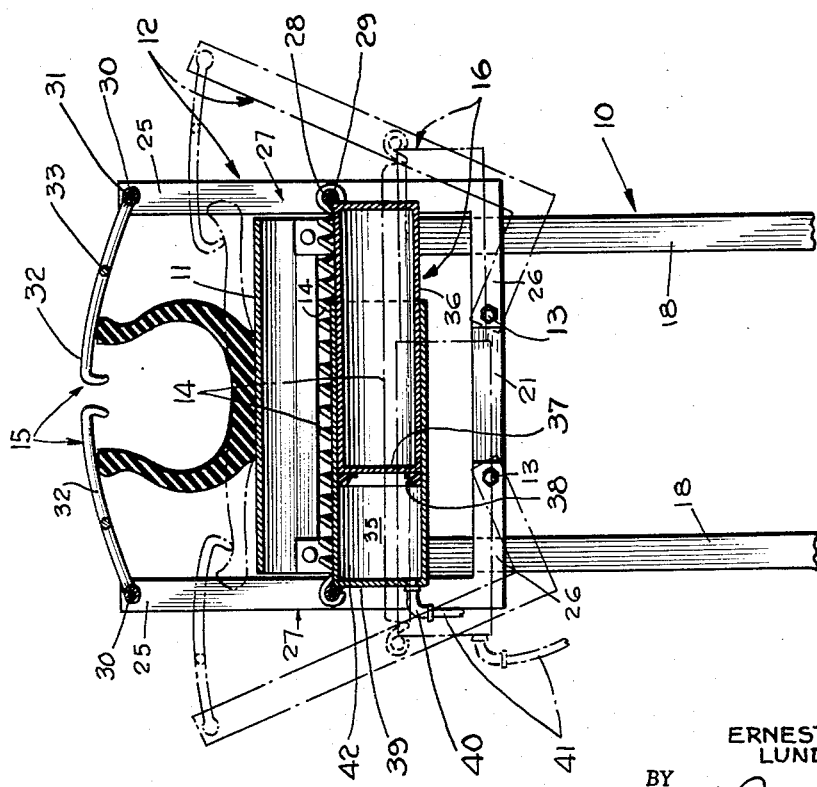

2,955,802
TIRE SPREADER

Ernst O. Douglass, 426 Caldwell St., Ontario, and Lundy E. Smith, 44226 Heaton Ave., Lancaster, Calif.

Filed July 13, 1959, Ser. No. 826,511

4 Claims. (Cl. 254—50.3)

This invention relates to tire spreaders, used for spreading the side walls of a tire casing to facilitate inspection of the interior thereof, and is particularly applicable to that type of tire spreader wherein spreader hooks engage side walls of the tire at the beads thereof and spread them apart in a horizontally swinging movement. The general object of the present invention is to provide an improved tire spreader of that general class.

In general, the invention contemplates an improved tire spreader embodying a vertical stand having a crowned platen at its upper end, to support a tire to be spread, a pair of spreader arm structures pivotally attached to such stand near its upper end and carrying respective spreader hooks, and a pressure fluid-type actuator suspended between the respective arms and operable for spreading and retracting such arms while carried thereby in a floating condition.

A particular object of the invention is to provide such a tire spreader wherein the parts are arranged with maximum compactness, particularly in horizontal directions, so that the spreader will occupy a minimum of floor space.

A major object of the invention is to provide such a spreader wherein the parts are arranged to operate with a minimum of travel of the spreader arms being required for adequate opening of the bottom portion of the tire resting upon the platen. Furthermore, the invention contemplates an arrangement wherein, for a given range of movement of the spreader hooks, the tire will be more completely spread out to a generally flat position or may in fact be spread to an inversely curved ("inside out") condition to facilitate inspection of its internal wall and increase the effectiveness of such inspection particularly in detecting small breaks in the internal wall of the tire carcass. To this end, the invention provides a construction and arrangement wherein the swinging movement of the spreader arms, at their upper ends where the spreader hooks are attached thereto, is a downwardly and laterally swinging movement throughout its entire range, rather than a generally horizontally swinging movement as in prior spreaders.

In many conventional tire spreaders, it is possible to develop inverse curvature in a small central area of the portion of the tire that is being spread. This is accomplished by means of a relatively small diameter plunger pushing upwardly against the tire tread at a point centrally disposed between the spreader hooks. The present invention makes it possible to spread a tire for a very substantial portion of its circumferential extent, to an inversely curved condition in which a relatively large rectangular area of the casing is fully spread out and inversely arched with a generally cylindrical contour circumferentially, so as to provide a highly efficient inspection of every portion of such rectangular area because of the inversely curved condition thereof.

Other objects and advantages will become apparent in the ensuing specifications and appended drawing in which:

Fig. 1 is a front elevational view of a tire-spreader embodying our invention;

Fig. 2 is a side elevational view of the same;

Fig. 3 is a vertical sectional view taken on the line 3—3 of Fig. 2; and

Fig. 4 is a vertical sectional view taken on the line 4—4 of Fig. 1.

Referring now to the drawings in detail, I have shown therein, as an example of one form in which the invention may be embodied, a tire spreader comprising, in general, a vertical stand 10 having at its upper end a crowned deck 11, a pair of spreader arm units 12 hinged to the stand 10 on parallel axes by pivots 13, springs 14 spring loading the arms 12 toward retracted positions shown in full lines in Fig. 1, a pair of spreader hook units 15 carried by the upper ends of the spreader arm units 12, a pneumatic actuator unit 16 suspended between the spreader arm units 12 and operable to spread them apart while floating vertically, and a foot operated valve 17 for controlling the pneumatic actuator 16.

The stand 10 comprises four vertical legs 18 secured (as by welding) at their lower ends to a pair of feet 19, preferably of angle iron as shown, a pair of tie rods 20 having their ends secured as by welding, immediately above the feet 19 and bridging therebetween, and a pair of horizontal beams 21 secured at their ends to respective legs 18, disposed in parallel relation to the feet 19, below and parallel to the forward and rear extremities of the deck 11. The deck 11 is of heavy gauge sheet metal having downturned flanges 22 along its forward and rear margins, and arched upwardly along its side margins 23 with a cylindrical or approximately cylindrical contour. The depending flanges 22 are secured, as by means of bolts 24, to the upper ends of the legs 18, against the outer faces thereof.

Each spreader arm unit 12 embodies a pair of L-shaped levers 27 each including a normally vertical arm 25 and a normally horizontal arm 26, the latter being disposed inwardly of and alongside the respective end of a cross beam 21 and pivoted thereto by means of a respective pivot 13.

The pivots 13 are located toward the center of the respective cross beams 21, inwardly of the legs 18 a substantial distance which may be approximately one fourth of the distance between the legs as indicated. The normally horizontal arms 26 are of a length such that the inner margins of the normally vertical arms 25, in the fully retracted positions thereof, will be in substantially registering relation with the outer side margins of legs 18. In their retracted position, arms 25 are positioned by engagement with the side margins 23 of the deck 11, which limits the retracting movements of the arms.

The levers 27 are arranged in pairs of fore and aft levers, one pair at each side of the machine. The levers of each pair are connected together by a strut 28 approximately midway between the upper and lower ends of arms 25 and secured thereto by means of a tie bolt 29 extending through both arms and through the strut 28 and secured by a nut at one end. The upper ends of arms 25 are pivotally attached to a respective spreader hook unit 15 by means of a pivot bolt 30 extending through registering apertures in said upper ends and through a tubular hub 31 to the respective ends of which a pair of spreader hooks 32 are secured, as by welding. A brace rod 33 extends between the hooks 32 of each unit 15, parallel to and spaced from the hub 31, with its ends secured to the hooks 32 as by welding.

Loading springs 14 are in the form of coil springs having conventional eyes at their respective ends, looped around the respective ends of tie rods 29 and secured by abutting engagement of the ends of strut 28 therewith.

Each of the springs 14 extends from side to side of the machine, between corresponding ends of the respective struts 28. The arms 25 being disposed in vertical planes inwardly of the legs 18 and the springs 14 having their longitudinal axes disposed slightly inwardly of the inner faces of arms 25, the springs will be disposed just inwardly of the legs 10 and slightly below the respective forward and rear extremities of deck 11 in the transversely extending corner spaces defined thereby. Correspondingly, the struts 28 are disposed just below the level of deck 11 and the arms 25 project both above and below the deck, to a somewhat greater extent below than above.

Since the pivots 13 are located inwardly a substantial distance from the sides of the apparatus, the upper ends of the arms 25 will swing outwardly and downwardly in the spreading movement of the levers 27. In the retracted positions of the levers, the upper ends of the arms will be substantially at the level of the beads of a tire disposed in a vertical plane parallel to the hubs 31 with its tread resting upon the deck 11 at the center thereof, and the hooks 32 can be readily dropped over the tire beads to engage the tire side walls internally. In the fully spread positions of the levers 27, indicated in broken lines in Fig. 1, the upper ends of arms 25 will have swung downwardly to positions substantially at the level of deck 11 and the respective sides of the tire will be spread out roughly horizontally and will conform to the cylindrical, crowned curvature of the deck. Thus the spread area of the tire will be inversely curved, placing the inner wall thereof under spreading tension. The tire is exposed for its full width and is inversely crowned for a very substantial portion of its circumference (corresponding to the fore-aft dimension of the deck). Maximum efficiency of inspection and repair is thus promoted. The deck 11 being of arched sheet metal construction with its two side extremities open, the coil springs 14 and actuator 16 are accommodated beneath the deck in fairly close association therewith, the actuator 16 lying immediately below the deck in the retracted, raised positions of the spreader lever units and floating downwardly with these units as they are spread apart by fluid pressure actuation of the actuator.

The actuator 16 (Fig. 4) comprises a cylinder 35 and a piston 36 each having a respective outer end, secured at its upper corner, as by welding, to a respective strut 28. The piston 36 is in the form of a cylinder of slightly smaller diameter than cylinder 35 and having an end wall 37 to which is secured a cup type seal 38. Cylinder 35 has a closed end 39 to which is attached a fitting 40 providing communication between an air hose 41 and a pressure chamber 42 defined between the piston 36 and the cylinder 35 and its end 39. Pedal operated valve 17 may be of any conventional three way type adapted, when pedal actuated, to establish communication between an air pressure line 43 and the hose 41 to deliver air under pressure into the actuator chamber 42 for spreading the levers 27; and adapted in an alternative position to establish a connection between the air hose 41 and atmosphere for bleeding the air out of the chamber 42 so that the springs 14 will return the levers 27 to their retracted positions.

The operation of the apparatus will be apparent in the foregoing description.

We claim:

1. In a tire spreader apparatus, a stand including supporting legs and, at its upper end, a fore-aft crowned deck; a pair of spreader lever units each comprising fore and aft levers of L-shape each having at its lower end a normally horizontal arm and having a normally vertical arm rising from the outer end of said horizontal arm, said normally horizontal arms extending beneath said deck toward one another and pivoted to said stand at their inner ends to provide axes of downwardly and upwardly hinging movement of the respective spreader units about fore-aft axes, said axes being parallel and disposed approximately midway between the legs and the median vertical fore-aft plane of the apparatus; spreader hook units pivotally attached to the upper ends of said normally vertical arms and extending toward one another above said deck for internal engagement of the beads of a tire supported upon said deck in an upstanding position in said median plane; and a fluid pressure energized actuator unit comprising telescoped cylinder and piston elements having their outer ends pivotally attached to and suspended between the normally vertical arms of the respective spreader lever units, said actuator being disposed closely below said deck in the retracted positions of said spreader lever units and adapted to float vertically downwardly with said spreader lever units as the latter are spread apart.

2. Spreader apparatus as defined in claim 1, including a pair of coil springs extending transversely between said spreader lever units and attached thereto under tension at the respective forward and rear sides of the stand; and a multiple position control valve for controlling the flow of fluid under pressure from a source to said actuator in one position thereof and for bleeding the fluid pressure from said actuator position thereof, whereby to provide for return of the spreader lever units to retracted positions under the spring loading of said coil springs.

3. Apparatus as defined in claim 2, wherein said coil springs are disposed in fore and aft transversely extending corner spaces immediately beneath said deck.

4. Apparatus as defined in claim 3, wherein each of said lever units includes a fore-aft strut bridging between and connecting the respective levers just below the level of said deck, and wherein the ends of said coil springs are attached to the respective ends of said struts.

References Cited in the file of this patent

UNITED STATES PATENTS

| | | |
|---|---|---|
| 2,310,891 | Branick | Feb. 9, 1943 |
| 2,375,595 | Stoehr | May 8, 1945 |